April 6, 1937.    P. E. SEEPE    2,076,518
HEATING SYSTEM
Filed April 15, 1935
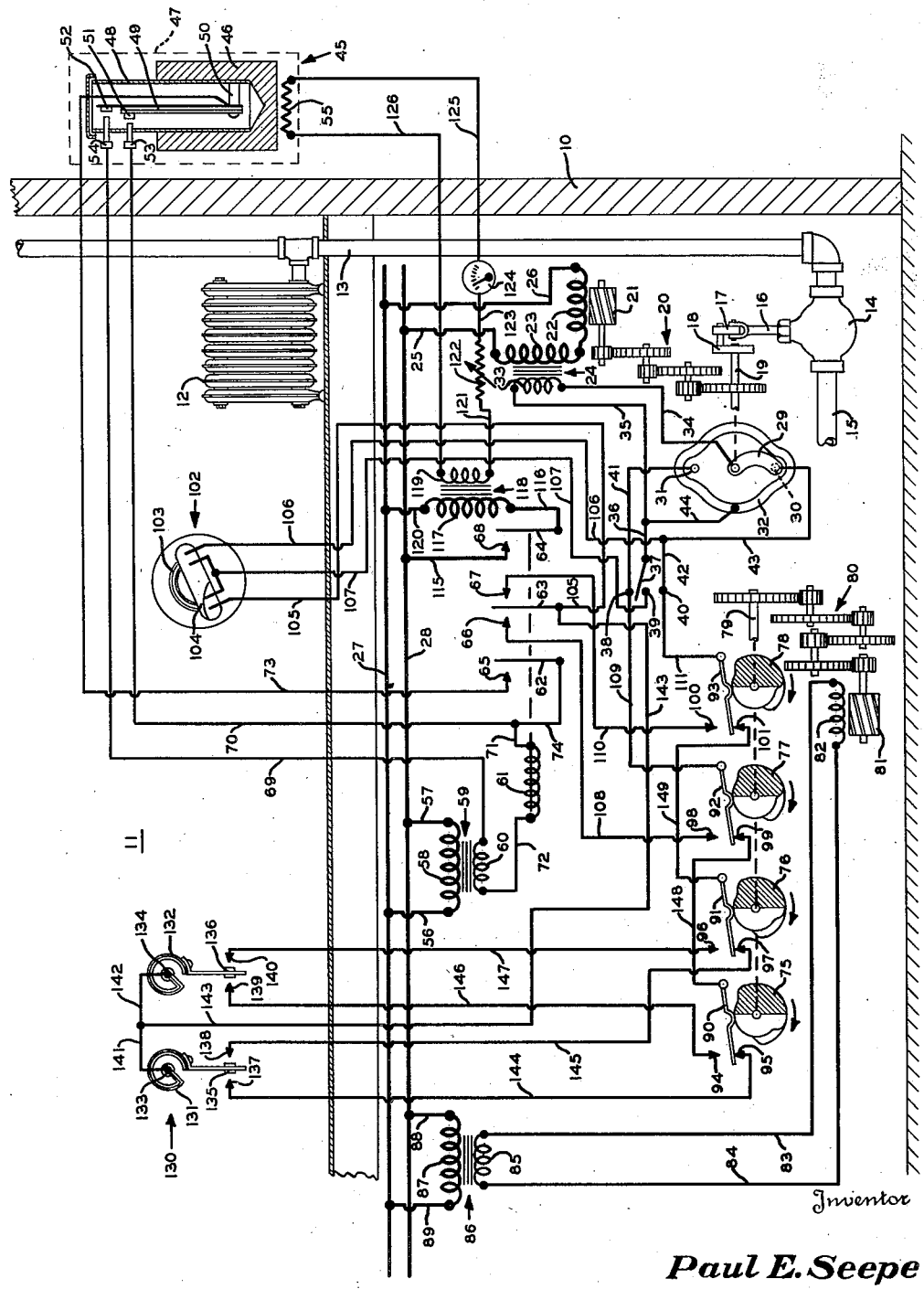
Inventor
Paul E. Seepe
By George H Fisher
Attorney Patented Apr. 6, 1937

2,076,518

UNITED STATES PATENT OFFICE 2,076,518

HEATING SYSTEM

Paul E. Seepe, Minneapolis, Minn., assignor to Minneapolis-Honeywell Regulator Company, Minneapolis, Minn., a corporation of Delaware Application April 15, 1935, Serial No. 16,273

9 Claims. (Cl. 236—91)

This invention relates to heating systems of the type disclosed in the application of Daniel G. Taylor, Serial No. 512,887, filed February 2, 1931.

The system disclosed in the above referred to Taylor application comprises an outdoor controller responsive to outdoor atmospheric conditions including temperature, wind and sun for controlling the temperature within the building. Heating means are provided in the building for supplying heat to the building and heating means are also provided in the outdoor controller for supplying heat to the outdoor controller. The two heating means are proportioned according to the heat losses from the building and from the outdoor controller. A thermostatic device is provided for responding to the temperature within the outdoor controller and when this thermostatic device calls for heat both of the heating means are energized to deliver heat to the building and to the outside controller. Due to the proportional relationship of the heating means with the heat losses of the building and the outside controller, a definite temperature relation is maintained within the building and the outside controller so that by responding to the temperature of the outside controller, the thermostatic device maintains a constant or normal temperature within the building.

Such a system gives excellent results when the system is maintained in operation for twenty-four hours a day. However, it is often desirable to shut down the heating system during the night to lower the temperature within the building to conserve on fuel costs. But, due to the fundamental theory of operation, the system of the Taylor application cannot supply sufficient heat to the building in the morning after a night shut down to rapidly raise the temperature to normal and thereafter maintain the temperature in the building at normal. This is caused by the fact that only sufficient heat is supplied to the building to maintain the temperature thereof constant according to variations in outside atmospheric conditions. In order to successfully operate the system of the type disclosed in the above referred to Taylor application where it is desired to have a night shut down, it is necessary that some independent means be provided for raising the temperature in the building to normal after a night shut down.

Therefore, it is an object of this invention to provide a "morning pick-up" control of the heating system whereby the building temperature is brought up to normal so that the temperature of the building may be maintained at normal by the outdoor controller.

Another object is to provide a means for controlling the temperature in a building during the day time according to variations in outside weather conditions and to provide means for night control at a lowered temperature in response to temperatures existing within the building.

Another object is to provide a night control for a building to maintain the building at lowered temperatures during the night, to provide for raising the temperature in the morning up to normal, and to provide for controlling the temperature of the building during the day time according to outside weather conditions.

A further object is to provide automatic means for shifting the control of the building from night inside temperature control to morning pick-up control and to day-time outside control.

Further, another object is to provide as a safety measure a high limit building control to prevent excessive temperatures from occurring in the building when the heating system is under the control of any of the controllers.

Other objects and advantages will become apparent to those skilled in the art by reference to the accompanying specification, claims and drawing in which drawing is diagrammatically shown the preferred form of my invention.

The heating system of my invention is capable of controlling any type of building whether it be a house used for domestic purposes or a large building used for offices or stores. A portion of the building is diagrammatically disclosed in the drawing, the building having an outside wall 10. One of the spaces to be heated is designated at 11. Located in each of the spaces to be heated 11 is a radiator 12 which receives heating fluid such as steam from a riser 13. The supply of heating fluid to the riser 13 is controlled by means of a valve 14 which is connected between the riser 13 and a supply pipe 15 leading from some source of heating fluid, not shown. Heating fluid may be supplied to the pipe 15 by a usual boiler or by a central heating system. Extending from the valve 14 is a valve stem 16 which is connected by means of a pitman 17 to a crank disc 18. Crank disc 18 is mounted on a rotatable shaft 19 which is rotated by a reduction gear train 20 interposed between the shaft 19 and a motor rotor 21.

The motor rotor 21 is operated upon energization of a motor field 22. One end of the motor field 22 is connected to one end of a primary 23 of a step-down choke type transformer 24. The other end of the primary 23 of the transformer is connected by means of a wire 25 to a line wire 28 and the other end of the field 22 is connected by means of a wire 26 to another line wire 27. The line wires 27 and 28 receive their power from some source, not shown.

Secured to the shaft 19 is a slider 29 which rotates with the rod 19 and is adapted to engage either contact 30 or contact 31. Located in the path of the movement of the slider 29 and in contact therewith when the slider is not in engagement with the contacts 30 and 31 is a conducting track 32. One end of the secondary 33 of the stepdown choke type transformer 24 is connected by means of a wire 34 to the slider 29. The other end of the secondary 33 is connected by means of wires 35 and 36 to a basement switch arm 37. The basement switch arm 37 is adapted to engage either of contacts 38, 39, and 40. Contact 38 is connected by means of a wire 41 to the contact 31 and the contact 40 is connected by means of wires 42 and 43 to the contact 30. A wire 44 connected to the junction of wires 35 and 36 is connected to the conducting track 32.

The valve 14 is shown in the open position. By moving the basement switch arm 37 into engagement with the "off" contact 40, the secondary 33 of the choke type transformer 24 is short-circuited by means of wires 35 and 36, switch arm 37, contact 40, wires 42 and 43, contact 30, slider 29 and wire 34. Upon shorting of the secondary 33 in this manner, current is allowed to flow from line wire 28 through wire 25, primary 23, field 22 and wire 26 back to the line wire 27 to start movement of the valve 14 towards its closed position. As the valve so begins to move, the slider 29 engages the track 32 thereby completing a maintaining circuit from the secondary 33 through wires 35 and 44, track 32, slider 29 and wire 34 back to the secondary 33. By reason of this maintaining circuit, complete operation of the motor and consequent closing movement of the valve 14 is assured. Closing movement of the valve will continue until the slider 29 moves out of engagement with the track 32 and into engagement with the contact 31 whereby the above related closing circuits for the valve are broken and the valve 14 will therefore remain in closed position. With the valve 14 in closed position and with the basement switch arm 37 moved to engagement with the "on" contact 38, the secondary 33 is short-circuited through wires 35 and 36, switch arm 37, contact 38, wire 41, contact 31, slider 29 and wire 34 whereby the motor will be placed in operation and the valve will be started on its movement in the opening direction. This opening movement of the valve causes the slider 29 to disengage the contact 31 and come into engagement with the track 32 whereby a maintaining circuit is completed from the secondary 33 through wires 35 and 44, track 32, slider 39 and wire 34 to complete the opening movement of the valve 14. The opening movement of the valve 14 will continue until the slider 29 disengages the track 32 and comes in contact with the contact 30 when it will be terminated and placed in condition for closing movement.

When the basement switch 37 is brought into engagement with the "automatic" contact 39, the valve 14 is conditioned for opening and closing movement by the various controls to be described hereafter.

An outside controller responsive to outside atmospheric conditions such as temperature, wind and sun is generally designated at 45. This outside controller 45 is disclosed in detail in the above referred to application of Daniel G. Taylor. Briefly, the outside controller consists of a block 46 enclosed within a casing 47. The block 46 is hollowed out and contains a container 48 in which is mounted by means of a post 50 a bimetallic element 49. The bimetallic element 49 is so arranged that it responds to the temperature of the bimetallic block 46. Mounted on the bimetallic member 49 are two contacts 51 and 52 which are adapted to sequentially engage contacts 53 and 54. Contacts 53 and 54 are made adjustable in order to obtain the proper operating differentials. Upon a decrease in temperature of the block, contact 54 is engaged by contact 52 and upon a further slight decrease in temperature, contact 53 is engaged by contact 51. The block 45 is heated by means of a heater designated at 55.

Primary 58 of a step-down transformer 59 is connected to the line wires 27 and 28 by means of wires 56 and 57 respectively. The step-down transformer 59 is provided with a secondary 60. A relay coil 61 is operatively connected to switch arms 62, 63 and 64 so that upon energization of relay coil 61, the switch arms 62, 63 and 64 are moved to the left and upon deenergization thereof, they are moved to the right by means of springs or gravity or other means, not shown. The switch arms 62, 63 and 64 are adapted to engage contacts 65, 66, 67, and 68. Upon energization of the relay coil 61, the switch arms 62, 63, and 64 are moved into engagement with contacts 65, 66 and 68, respectively, and upon deenergization of the relay coil 61, the switch arms are moved out of engagement with these contacts and the switch arm 63 is moved into engagement with the contact 67.

One end of the secondary 60 of the step-down transformer 59 is connected by means of a wire 69 to the stationary contact 54. The other stationary contact 53 is connected by means of a wire 70 and a wire 71 to one end of the relay coil 61. The other end of the relay coil 61 is connected by means of a wire 72 to the other end of the secondary 60. The post 50 which supports the bimetallic element 49 is connected by means of a wire 73 to the contact 65 and the switch arm 62 is connected by means of a wire 74 to the junction of wires 70 and 71.

When the temperature of block 46 of the outdoor controller 45 drops to a predetermined value, contact 52 first engages contact 54 and subsequently contact 51 engages contact 53. When contacts 51, 53, 52 and 54 are made, a circuit is completed from the secondary 60 of the step-down transformer 59 through wire 69, contacts 54, 52, 51 and 53, wire 70, wire 71, relay coil 61 and wire 72 back to the secondary 60. This causes energization of the relay 61 to move the switch arms 62, 63 and 64 into engagement with contacts 65, 66 and 68, respectively. Upon closing of these relay switches by the completion of the above described circuit, a second or holding circuit is completed from the secondary 60 of the step-down transformer 59 through wire 69, contacts 54 and 52, bimetallic element 49, wire 73, contact 65, switch arm 62, wire 74, wire 71, relay coil 61 and wire 72 back to the secondary 60. By reason of this holding circuit, the relay coil 61 will remain energized until the temperature of the block 46 rises to a sufficient value to break contact between contacts 52 and 54. From the above, it is seen that upon a call for heat by the bimetallic element 49, in response to a low block temperature, the relay 61 is energized to close the relay switches 62, 63 and 64.

This invention contemplates the use of a time switch for automatic operation although the functions of the time switch may be performed manually. The time switch is diagrammatically shown to include adjustable cams 75, 76, 77 and 78 all mounted on a cam shaft 79. The shaft 79 is driven through a reduction gear train 80 by a motor rotor 81. The field 82 of the motor is connected by means of wires 83 and 84 to a secondary 85 of a step-down transformer 86. The primary 87 of this transformer is connected by means of wires 88 and 89 to the line wires 26 and 27, respectively. The motor 81 drives constantly the shaft 79 through the gear train 80 at such a speed that the shaft 79 and the cams 75, 76, 77, and 78 driven thereby are rotated once during every twenty-four hours in the direction shown by the arrows. Riding on the surface of cams 75, 76, 77, and 78 are contact arms 90, 91, 92, and 93, respectively. When the low dwells of the cams are engaged by the contact arms, the contact arms 90, 91, 92, and 93 are in engagement with contacts 95, 97, 99, and 101, respectively, and when the high dwells of the cams are engaged by the contact arms, the contact arms 90, 91, 92, and 93 are brought into engagement with the contacts 94, 96, 98, and 100, respectively.

In order to more clearly disclose the operation of this device, the cams 75, 76, 77, and 78 have been shaded in order to designate day and night surfaces thereon, the day surface being clear and the night surface being shaded. The cams are in a position therefore which corresponds to midnight. Upon rotation of the cams in a clockwise direction as shown by the arrows, the high dwells of cams 75 and 76 will first engage the contact arms 90 and 91 at a time corresponding to 6:00 a. m. to move the contact arms 90 and 91 out of engagement with contacts 95 and 97 and into engagement with the contacts 94 and 96. Upon a further clockwise movement, the high dwells of the cams 77 and 78 are engaged with the contact arms 92 and 93 at a time corresponding to substantially 8:00 a. m. to cause movement of the contact arms 92 and 93 out of engagement with the contacts 99 and 101 and into engagement with the contacts 98 and 100. The contact arms are all maintained in their upper positions until they return to the low dwells of the cams at a time which is shown to be substantially 9:00 p. m. The above specific times set forth for the operation of the contact arms are not fixed and may be varied at will by reason of the fact that the cams are made adjustable.

Located in one of the spaces to be heated 11 is a room high limit controller 102 which may comprise a bimetallic member 103 for actuating a mercury switch 104. The mercury switch 104 is shown to contain four electrodes therein, the two adjacent electrodes being connected together. The room high limit control is so arranged that upon the existence of a temperature below a predetermined value, the mercury switch 104 is located in the position shown in the drawing and upon a rise of the temperature above the predetermined value, the mercury switch 104 is tilted in a clockwise direction so that the mercury contained therein will engage the two right-hand electrodes. The left hand electrode is connected by means of a wire 105 to the switch arm 63 of the relay switch. The right hand electrode is connected by mens of a wire 106 to the junction of wires 42 and 43. The two middle electrodes, which are connected together, are connected by means of a wire 107 to the "automatic" contact 39 of the basement switch. The contact 98 of the time switch is connected by means of a wire 108 to the contact 66 of the relay. The contact arm 92 of the time switch is connected by means of a wire 109 to the "on" contact 38 of the basement switch. The contact 100 of the time switch is connected by means of a wire 110 to the contact 67 of the relay switch. The contact arm 93 of the time switch is connected by means of a wire 111 to the "off" contact 40 of the basement switch.

Assume that the time of day is noon and that the contact arms 90, 91, 92, and 93 of the time switch are held in their open positions by the cams which position places the system under the control of the outside controller. Also, assume that the valve 14 is in a closed position whereby the slider 29 is in engagement with the contact 31. Upon a call for heat by the outside controller, the relay coil 61 is energized in the manner pointed out above to move the switch arm 63 into engagement with the contact 66 of the relay switch. By reason of such operation of the relay, a circuit is completed from the secondary 33 through wires 35 and 36, switch arm 37 and contact 39 of the basement switch, wire 107, mercury switch 104, wire 105, switch arm 63, contact 66, wire 108, contact 98, contact arm 92, wire 109, wire 41, contact 31, slider 29 and wire 34 back to the secondary 33 of the choke type transformer 24 to cause opening movement of the valve 14 and delivery of heat to the building. When the temperature in the outside controller rises to a predetermined value, the relay coil 61 will be deenergized to cause switch arm 63 to engage contact 67 of the relay switch whereby a circuit is completed from the secondary 33 of the choke type transformer 24 through wire 35, wire 36, switch arm 37 and contact 39 of the basement switch, wire 107, mercury switch 104, wire 105, switch arm 63, contact 67, wire 110, contact 100, contact arm 93, wires 111, 42 and 43, contact 30, slider 29 and wire 34 back to the secondary 33 to energize the valve motor to move the valve 14 to a closed position to shut off the supply of heating fluid to the building.

If the temperature within the building becomes too high, the room high limit control will tilt the mercury switch 104 in a clockwise direction to complete a circuit from the secondary 33 of the choke type transformer through wire 35, wire 36, switch arm 37, contact 39, wire 107, mercury switch 104, wire 106, wire 43, contact 30, slider 29 and wire 34 back to the secondary 33 to cause closing movement of the valve 14 regardless of whether the outside controller 45 is calling for heat. This affords a room high limit control to prevent the temperature of the room or space to be heated from becoming excessive.

A wire 115 connects the line wire 28 with the contact 68 of the relay switch. The switch arm 64 thereof is connected by means of a wire 116 to one end of a primary 117 of a step-down transformer 118 having the usual secondary 119. The other end of primary 117 is connected by means of a wire 120 to the line wire 27. The secondary 119 of the transformer 118 is connected by means of a wire 121 to a variable resistance 122 and the variable resistance is in turn connected by means of a wire 123 to an ammeter 124. The ammeter in turn is connected by means of a wire 125 to one end of the heating element 55 of the outside controller 45. The other end of the heating element 55 is connected by means of a wire 126 to the secondary 119. Therefore, when the outside controller calls for heat and energizes the relay coil 61 to cause opening of the supply of heating fluid to the building, the switch arm 64 is brought into engagement with the contact 68 to complete a circuit through the transformer 118 and causes a flow of current through the heater 55 by reason of its connection with the secondary 119 of transformer 118. It follows then, that every time heat is supplied to the building under the control of the outside controller, heat is likewise supplied to the outside controller to increase the temperature of the metallic block 46. Here in this case, as in the Taylor application, a proportion is set up between the heat losses from the building and from the outside controller and the amount of heat supplied to the building and to the controller. Therefore, the temperature within the outside controller 45 bears a relation with the temperature within the building so that by controlling the temperature within the outside controller the temperature within the building is similarly controlled. The variable resistances 122 and the ammeter 124 provide a means for varying and visually indicating the amount of heat supplied to the outside controller 45 whereby this ratio may be set up to afford the proper operation of the system.

Located within the building is a day-night thermostat generally indicated at 130 having a night thermostat 131 which controls the heating system during the night and a "morning pick-up" thermostat 132 which controls the heating system during the morning pick-up period. The morning pick-up thermostat is adjusted to the normal day temperature within the building and the night thermostat 131 is adjusted to the night temperature which is lower than the normal. The thermostats 131 and 132 are each mounted on posts 133 and 134, respectively, and each has movable contacts 135 and 136, respectively. The contacts 135 of the night thermostat 131 are adapted to engage alternately contacts 137 and 138 and the contacts 136 of the morning pick-up thermostat 132 are adapted to engage alternately contacts 139 and 140.

The posts 133 and 134 are connected together by means of wires 141 and 142 and to a wire 143 which extends to the switch arm 63 of the relay switch. Contact 137 is connected by means of a wire 144 to the contact 95 and the contact 138 is connected by means of a wire 145 to the contact 97. The contact 139 is connected by means of a wire 146 to the contact 94 and the contact 140 is connected by means of a wire 147 to the contact 96. The contact arm 90 of the time switch is connected by means of a wire 148 to the contact 99 and the contact arm 91 is connected by means of a wire 149 to the contact 101.

Since the time switch is shown in the position corresponding to midnight, the night thermostat 131 is in control. Assume that the valve 14 is in a closed position. When the temperature in the building falls below the night temperature setting, contact 135 of the night thermostat 131 engages contact 137 to complete a circuit from the secondary 33 of the choke type transformer through wire 35, wire 36, basement switch 37, contact 39, wire 107, mercury switch 104, wire 105, wire 143, wire 141, post 133, thermostat 131, contact 135, contact 137, wire 144, contact 95, contact arm 90, wire 148, contact 99, contact arm 92, wire 109, wire 41, contact 31, slider 29 and wire 34 back to the secondary 33 to cause operation of the valve motor to move the valve 14 to an open position to supply heating fluid to the building. When the temperature of the building rises to the night temperature setting, then contact 135 of the night thermostat 131 engages contact 138 to complete a circuit from the secondary 33 of the choke type transformer 24 through wire 35, wire 36, switch arm 37, contact 39, wire 107, mercury switch 104, wire 105, wire 143, wire 141, post 133, thermostat 131, contact 135, contact 138, wire 145, contact 97, contact arm 91, wire 149, contact 101, contact arm 93, wire 111, wire 42, wire 43, contact 30, slider 29 and wire 34 back to the secondary 33 to cause operation of the valve motor to move the valve 14 to closed position to shut off the supply of heat to the building. In this manner, the temperature of the building is maintained at a constant temperature corresponding to the night temperature setting of the night thermostat 131.

At 6:00 a. m., contact arms 90 and 91 are moved out of engagement with contacts 95 and 97 by the cams 75 and 76, respectively, and into engagement with the contacts 94 and 96. Such movement of contact arms 90 and 91 take the control of the heating system away from the night thermostat 131 and place it under the morning pick-up thermostat 132 which thermostat is adjusted for the normal day temperature. With the time switch in this latter position and with the valve 14 in the closed position and the temperature being below the normal day temperature, contact 136 of the morning pick-up thermostat 132 will engage contact 139. This will complete a circuit from the secondary 33 of the choke type transformer 24 through wire 35, wire 36, switch arm 37, contact 39, wire 107, mercury switch 104, wire 105, wire 143, wire 142, post 134, thermostat 132, contact 136, contact 139, wire 146, contact 94, contact arm 90, wire 148, contact 99, contact arm 92, wire 109, wire 41, contact 31, slider 29 and wire 34 back to the secondary 33 to cause operation of the valve motor to move the valve 14 to open position to supply heat to the building for the morning pick-up to raise the temperature of the building to the normal day value. When the temperature of the building rises to this normal day value, contact 136 of the morning pick-up thermostat 132 engages contact 140 to complete a circuit from the secondary 33 of the choke type transformer 24 through wire 35, wire 36, switch arm 37, contact 39, wire 107, mercury switch 104, wire 105, wire 143, wire 142, post 134, thermostat 132, contact 136, contact 140, wire 147, contact 96, contact arm 91, wire 149, contact 101, contact arm 93, wire 111, wire 42, wire 43, contact 30, slider 29 and wire 34 back to the secondary 33 to operate the valve motor to move the valve 14 to a closed position to shut off the supply of heat to the building.

At 8:00 a. m. in the morning, cams 77 and 78 move the contacts 92 and 93 out of engagement with contacts 99 and 101 and into engagement with contacts 98 and 100, respectively. Such movement of contact arms 92 and 93 takes the control of the heating system away from the day-night thermostat 130 entirely and places the control in the command of the outside controller and the outside controller functions to control the heating system in the manner pointed out specifically above. At 9:00 o'clock at night, the cams 75, 76, 77, and 78 move the contact arms 90, 91, 92, and 93 from their upper positions to their lower positions as shown in the drawing to place the night thermostat 131 in control.

It will be noted at this point that the room high limit control 102 is in series with all of the controlling circuits, that of the outside controller, that of the night thermostat, and that of morning pick-up thermostat whereby the occurrence of excessive building temperatures is entirely prevented.

From the above, it is seen that I have provided a conditioning or heating system for a building which is controlled by an outdoor controller in the day time whereby the temperatures in the building may be maintained at a predetermined value according to variations in outdoor temperature. Also, I have provided a means for taking the control away from the outside controller at night and to control the heating system by a night controller whereby a lowered temperature is maintained in the building during the night. I have also provided a means whereby the building may be brought up to normal temperature in the morning before the control is shifted to the outdoor controller. This provides for a rapid morning pick-up which could not be obtained in the Taylor application because of the fundamental features of that control.

Although I have disclosed one specific embodiment of my invention, I do not wish that my invention be limited thereto but that its scope shall be determined by the accompanying claims and the prior art.

I claim as my invention:

1. In a system of the class described, temperature changing means for a building, an outside controller subject to the same atmospheric conditions as the building, temperature changing means for said outside controller, means responsive to the temperature of said controller for controlling both of said temperature changing means to maintain the temperature of the building at a normal value, time means for rendering said outside controller ineffective to control said building temperature changing means whereby the building temperature may become other than normal, and thermostatic means for restoring the temperature of the building to normal.

2. In a system of the class described, temperature changing means for a building, an outside controller subject to the same atmospheric conditions as the building, temperature changing means for said outside controller, means responsive to the temperature of said controller for controlling both of said temperature changing means to maintain the temperature of the building at a normal value, temperature responsive means for maintaining the building temperature at a value other than normal, temperature responsive means for restoring the building temperature to normal, and time means for determining which of said temperature responsive means shall be in control of said building temperature changing means.

3. In a system of the class described, temperature changing means for a building, temperature responsive means outside of the building for controlling said temperature changing means to maintain a normal temperature within said building, temperature responsive means inside of the building for controlling said temperature changing means to maintain a temperature within said building other than normal, temperature responsive means inside of the building for controlling said temperature changing means to restore the temperature of the building to normal, and means for selecting any one of the temperature responsive means to control the temperature changing means.

4. In a system of the class described, temperature changing means for a building, temperature responsive means outside of the building for controlling said temperature changing means to maintain a normal temperature within said building, temperature responsive means inside of the building for controlling said temperature changing means to maintain a temperature within said building other than normal, temperature responsive means inside of the building for controlling said temperature changing means to restore the temperature of the building to normal, and time means for placing the control of the temperature changing means under each of the temperature responsive means in sequence.

5. In a system of the class described, temperature changing means for a building, temperature responsive means outside of the building for controlling said temperature changing means to maintain a normal temperature within said building, temperature responsive means inside of the building for controlling said temperature changing means to maintain a temperature within said building other than normal, temperature responsive means inside of the building for controlling said temperature changing means to restore the temperature of the building to normal, and temperature responsive means inside of said building for rendering at least one of said temperature responsive means inoperative to control said temperature changing means.

6. In a system of the class described, temperature changing means for a building, an outside controller subject to the same atmospheric conditions as the building, temperature changing means for said outside controller, means responsive to the temperature of said controller for controlling both of said temperature changing means to maintain the temperature of the building at a normal value, means for controlling said building temperature changing means to maintain the building at a temperature other than normal, and means for controlling said building temperature changing means to restore the building to the normal temperature value.

7. In a system of the class described, temperature changing means for a building, an outside controller subject to the same atmospheric conditions as the building, temperature changing means for said outside controller, means responsive to the temperature of said controller for controlling both of said temperature changing means to maintain the temperature of the building at a normal value, thermostatic means for controlling said building temperature changing means to maintain the building at a temperature other than normal, thermostatic means for controlling said building temperature changing means to restore the building temperature to normal, and time means for shifting the control from one of said thermostatic means to the other.

8. In a system of the class described, temperature changing means for a building, an outside controller subject to the same atmospheric conditions as the building, temperature changing means for said outside controller, means responsive to the temperature of said controller for controlling both of said temperature changing means to maintain the temperature of the building at a normal value, and time means and thermostatic means responsive to the temperature of the building for controlling said building temperature changing means to maintain the building at a temperature other than normal and to restore the building temperature to normal.

9. In a system of the class described, temperature changing means for a building, an outside controller subject to the same atmospheric conditions as the building, temperature changing means for said outside controller, means responsive to the temperature of said controller for controlling both of said temperature changing means to maintain the temperature of the building at a normal value, means for rendering said outside controller inoperative to control said building temperature changing means whereby the building temperature becomes other than normal, and means for restoring the temperature of the building to the normal value.

PAUL E. SEEPE.